June 27, 1967 M. STIMLER 3,328,712

SYSTEM FOR PHASE (FREQUENCY) MODULATION OF
AN RF CARRIER FOR LOW FREQUENCY SIGNAL

Filed Aug. 24, 1962

INVENTOR.
MORTON STIMLER

BY [signature]

ATTY.

United States Patent Office
3,328,712
Patented June 27, 1967

3,328,712

SYSTEM FOR PHASE (FREQUENCY) MODULATION OF AN RF CARRIER FOR LOW FREQUENCY SIGNAL

Morton Stimler, 8308 14th Ave., Hyattsville, Md. 20783

Filed Aug. 24, 1962, Ser. No. 219,825
5 Claims. (Cl. 330—10)

The invention described herein may be manufactured and used by or for the Government of the United States of America for governmental purposes without the payment of any royalties thereon or therefor.

This invention relates to an apparatus for phase modulation of a radio frequency carrier signal and more particularly to phase modulation of a carrier signal by the use of a progressively saturated tapered ferrite within a wave guide section.

In working with progressive saturation techniques it was discovered that such progressive saturation techniques might be applied to a tapered ferrite in a wave guide for phase or frequency modulating a radio frequency carrier wave. It is known that radio frequency energy passing through a wave guide will be reflected and returned in the wave guide if a reflection boundary is present in the wave guide. In this invention a tapered ferrite core which is normally saturated to approximately one-half of the length is provided for the purposes furnishing a reflecting boundary. This boundary is the point between the nonsaturated and the saturated portions of the ferrite core where a change in characteristic impedance occurs. By causing the saturation level of the ferrite to change in accordance with signal voltage as hereinafter more fully described, the position of the reflection boundary may be changed at the same rate, modulating the carrier signal in the wave guide.

An object of this invention is to provide a tapered ferrite in a wave guide for modulating and detecting a carrier frequency electromagnetic wave.

Another object of this invention is to provide a tapered ferrite for modulating a carrier frequency electromagnetic wave.

A further object of this invention is to provide a wave guide system including a tapered ferrite within the wave guide which is variably saturated in accordance with a signal voltage to modulate a radio frequency carrier wave.

A still further object of this invention is to provide a tapered ferrite within a wave guide and to variably saturate said ferrite in accordance with a signal voltage whereby a radio frequency carrier wave may be modulated.

Figure 1:
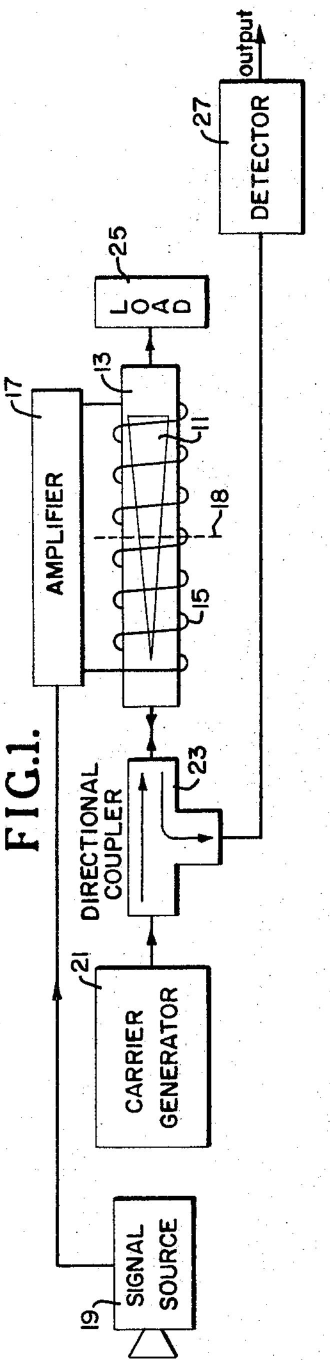
Figures 2A, 2B, 2C, 2D, 2E:
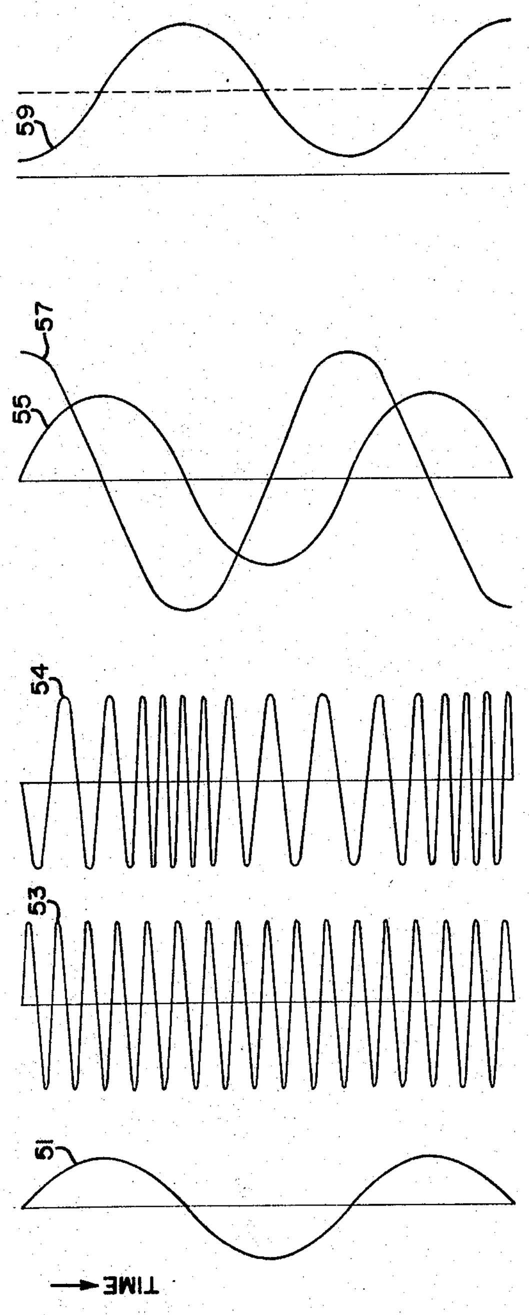

Other objects and many of the attendant advantages of this invention will be readily appreciated as the same becomes better understood by reference to the following detailed description when considered in connection with the accompanying drawings wherein:

FIG. 1 of the drawings illustrates a wave guide system employing a tapered ferrite;

FIG. 2*a* of the drawings illustrates a sinusoidal signal wave form;

FIG. 2*b* of the drawings illustrates a carrier waveform;

FIG. 2*c* of the drawings illustrates a modulated wave resulting from modulating the carrier wave form of FIG. 2*b* by the signal wave form of FIG. 2*a*;

FIG. 2*d* of the drawings illustrates curves indicating the distance and velocity of travel of the reflection boundary of the ferrite; and FIG. 2*e* illustrates the detected wave form resulting from demodulation of the wave of FIG. 2*c*.

Referring now to FIG. 1 of the drawings, a tapered ferrite 11 is disposed within a wave guide portion 13.

Wave guide portion 13 is provided with a winding 15 connected to the output circuit of an amplifier 17. A signal source 19 is connected to the input of amplifier 17 and is adapted to apply a signal thereto. This signal is to be amplified by amplifier 17 and applied to winding 15 to supply a magnetic field through ferrite 11 which is proportional to the strength of the signal applied. An example of such a signal is the sinusoidal wave 51 shown in FIG. 2*a* of the drawings. A carrier frequency generator 21 is connected to wave guide 13 through directional coupler 23. Carrier frequency generator 21 supplies a carrier frequency wave 53 as shown in FIG. 2*b*, to the wave guide portion which is modulated by the sine wave of signal source 19 applied as a varying magnetic field to ferrite 11. The signal is illustrated in FIG. 2*a* of the drawings as a sinusoidal wave 51. A load 25 is provided to absorb high frequency energy passing through wave guide 13. Directional coupler 23 is also connected to a detector circuit 27. Energy reflected from wave guide 13 is passed to detector 27 where the reflected energy is demodulated or detected. With tapered ferrite 11 partially saturated, reflection will occur at the boundary between the saturated and unsaturated portions of the ferrite indicated by dashed line 18. When a signal, for example the sinusoidal signal 51 illustrated in FIG. 2*a*, is applied to coil 15 the location or position of the boundary will vary sinusoidally as shown by curve 55 of FIG. 2*d*. The velocity of the boundary is shown by curve 57 of FIG. 2*d*.

In operation, signal source 19 generates a voltage, for example, the sinusoidal voltage illustrated by curve 51 in FIG. 2*a* of the drawings. This voltage is amplified by amplifier 17 and applied to winding 15, providing a varying magnetic field about tapered ferrite 11. At the same time a carrier frequency wave of radio energy generated by carrier frequency generator 21 is applied to the wave guide portion 13 through directional coupler 23. In addition to the signal voltage, a bias voltage is applied to winding 15. This bias voltage is adjusted to provide a desired quiescent saturation level of the tapered ferrite 11. For purposes of illustration it is assumed that this level will saturate one-half of the length of ferrite 11. That is, a D.C. magnetizing field applied through ferrite 11 as a result of the D.C. bias voltage applied to winding 15 will be of such a magnitude as needed to saturate the tapered ferrite core to 50 percent of the length of the core as indicated by dashed line 18.

When the carrier frequency wave is applied to wave guide 13 through directional coupler 23, the wave will be reflected at the saturation boundary of ferrite 11. The reflected wave is phase or frequency modulated by the doppler shift caused by the moving saturation boundary of ferrite 11. This modulated wave is illustrated as curve 54 of FIG. 2*c* of the drawings. The reflected wave will then be returned to directional coupler 23 and then passed on to detector 27 as indicated by the arrows. The modulated reflected wave is then demodulated by detector 27 and a detected audio frequency wave as shown by curve 59 in FIG. 2*e* will appear at the output of detector 27.

Any portion of the carrier signal which is not reflected at the saturation boundary and passes through the ferrite will be absorbed by the load 25 which is matched to the wave guide 13. This absorption minimizes the spurious reflections from that portion of the carrier energy which passes through ferrite 11 which might otherwise be superimposed on the modulated carrier and distort the detected output.

While a D.C. bias voltage applied to a winding surrounding the ferrite is shown as a means of obtaining the desired quiescent saturation level in the ferrite, other means such as a permanent magnet, for example, may be employed.

Obviously many modifications and variations are possible in the light of the above teachings. It is therefore to be understood, that within the scope of the appended claims, the invention may be practiced otherwise than as specifically described.

What is claimed is:

1. A phase modulator comprising a signal source, a wave guide system, a section of said wave guide system having a tapered ferrite therein, load means in said wave guide system, a carrier frequency generator for generating carrier frequency waves, an amplifier having an input and an output, a coil wound around the section of the wave guide containing said ferrite, said coil being connected to the output of said amplifier, a D.C. bias voltage source connected to said coil whereby said ferrite may be saturated to a desired level, means connecting the input of said amplifier to said signal source whereby the position of the saturation boundary of said ferrite may be shifted about said desired level at a rate and distance representing the change in signal from said signal source, directional coupler means in said wave guide connecting said carrier frequency generator to the section of said wave guide system whereby a carrier wave may be applied to said ferrite and said carrier wave may be modulated by shifting the position of the saturation boundary of said ferrite, and detector means connected to said directional coupler means for detecting the modulated wave.

2. A frequency modulation system comprising a wave guide, a tapered ferrite within said wave guide, means applying a desired saturation level to said ferrite whereby a reflection boundary is established within said wave guide, means shifting said saturation level at a rate and magnitude indicative of the variations of a signal voltage, and means applying a carrier wave to said wave guide whereby said carrier wave may be modulated.

3. A phase modulator comprising a wave guide, a tapered ferrite within said wave guide, a winding wound on said wave guide, a D.C. voltage source connected to said winding whereby said ferrite may be saturated to a desired portion of the length thereof to establish a reflecting boundary in said wave guide at the plane between saturated and unsaturated portions of said ferrite, a signal generator, means applying the output of said signal generator to said winding whereby said reflecting boundary may be moved with a variation in signal magnitude of a signal applied to said winding, a carrier wave generator connected to said wave guide whereby carrier signals may be propagated through said wave guide and reflected by said reflection boundary causing the reflected carrier signals to be phase modulated.

4. A frequency modulator comprising a first wave guide section including a directional coupler, a second wave guide section having a tapered ferrite therein, a third wave guide section having a load absorbing means therein, magnetic means surrounding said second wave guide section for supplying a D.C. magnetic field about said ferrite whereby a desired portion of said ferrite may be saturated and a reflection boundary may be established, means for varying said D.C. magnetic field according to variations in magnitude of an input signal whereby the position of said reflection boundary is shifted, said first, second and third wave guide sections being connected together respectively such that a radio frequency signal may be passed therethrough, means applying a radio frequency carrier signal to said first wave guide section whereby said signal may be modulated by varying said D.C. magnetic field.

5. A phase modulator comprising a signal source, a wave guide system, a portion of said wave guide having a tapered ferrite therein, load means in said wave guide system, a carrier frequency generator for generating carrier frequency waves, an amplifier having an input and an output, a coil surrounding the portion of said waveguide containing said ferrite, said coil being connected to the output of said amplifier, a permanent magnet placed in adjacency to said ferrite whereby said ferrite may be saturated to a desired level, means connecting the input of said amplifier to said signal source whereby the position of the saturation boundary of said ferrite may be shifted at a rate representing the change in signal from said signal source, directional coupler means connecting said carrier frequency generator to said wave guide system circuit whereby a carrier wave may be applied to the portion of said wave guide containing said ferrite and whereby said carrier wave may be modulated by shifting the position of the saturation boundary of said ferrite, and detector means connected to said directional coupler means for detecting the modulated wave.

References Cited

UNITED STATES PATENTS

| | | | |
|---|---|---|---|
| 2,748,353 | 5/1956 | Hogan | 332—51 |
| 2,778,887 | 1/1957 | Bradley | 330—54 |
| 2,906,974 | 9/1959 | Reggia et al. | 332—51 |
| 2,975,379 | 3/1961 | McLeod | 332—51 |

ROY LAKE, *Primary Examiner.*

NATHAN KAUFMAN, *Examiner.*